Figure 1:
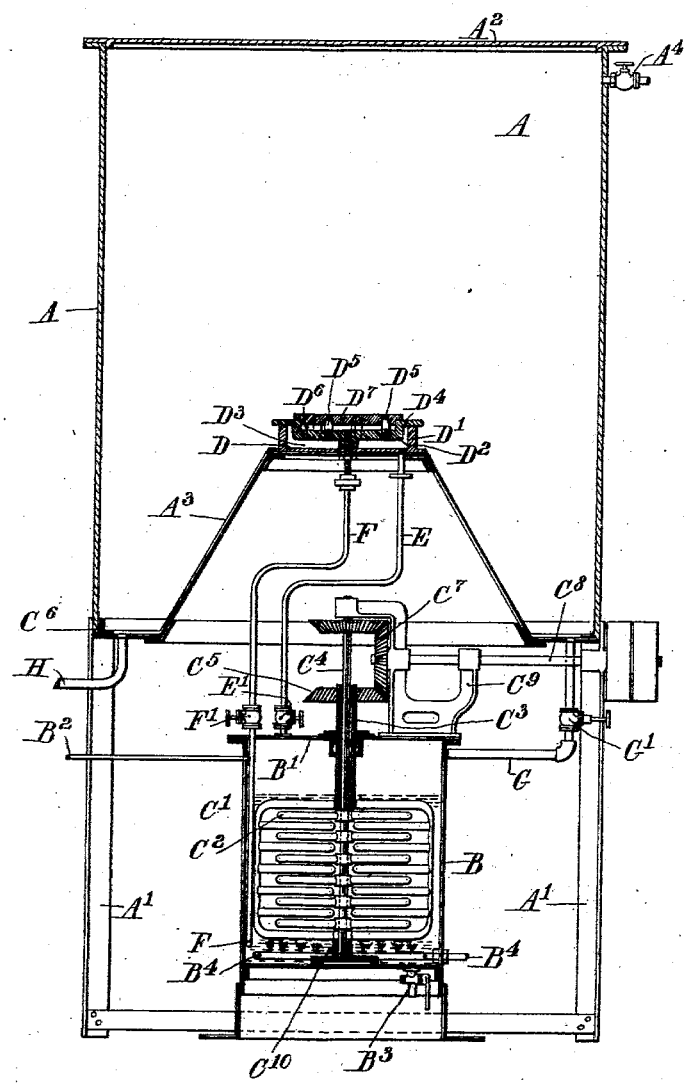

No. 634,093. Patented Oct. 3, 1899.
S. ROSENBLUM & C. J. YARNOLD.
APPARATUS FOR MANUFACTURING HYDROGEN PEROXID.
(Application filed Dec. 31, 1897.)
(No Model.) 3 Sheets—Sheet 1.

No. 634,093. Patented Oct. 3, 1899.
S. ROSENBLUM & C. J. YARNOLD.
APPARATUS FOR MANUFACTURING HYDROGEN PEROXID.
(Application filed Dec. 31, 1897.)
(No Model.) 3 Sheets—Sheet 2.
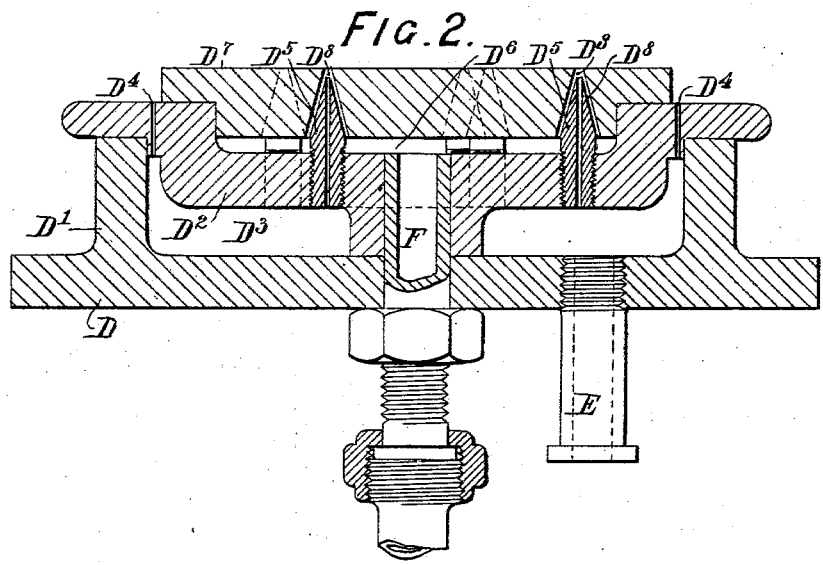
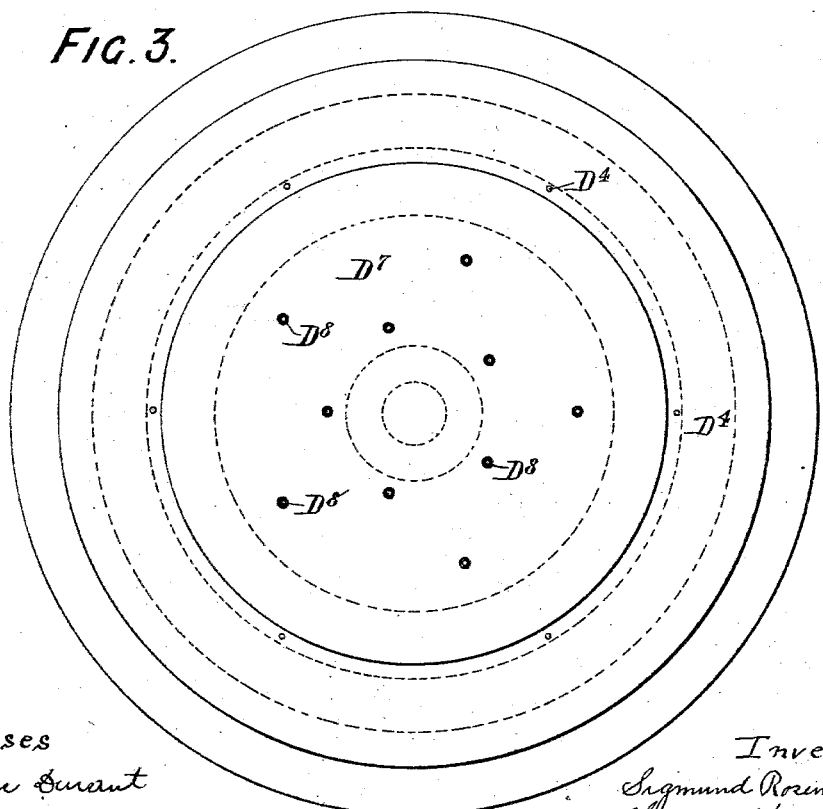

No. 634,093. Patented Oct. 3, 1899.
S. ROSENBLUM & C. J. YARNOLD.
APPARATUS FOR MANUFACTURING HYDROGEN PEROXID.
(Application filed Dec. 31, 1897.)
(No Model.) 3 Sheets—Sheet 3.

Witnesses:

Inventors:
Sigmund Rozenblum
Charles J. Yarnold

UNITED STATES PATENT OFFICE.

SIGMUND ROSENBLUM AND CHARLES JOHN YARNOLD, OF LONDON, ENGLAND, ASSIGNORS TO THE COMMERCIAL OZONE SYNDICATE, LIMITED, OF SAME PLACE.

APPARATUS FOR MANUFACTURING HYDROGEN PEROXID.

SPECIFICATION forming part of Letters Patent No. 634,093, dated October 3, 1899.

Application filed December 31, 1897. Serial No. 664,954. (No model.)

*To all whom it may concern:*

Be it known that we, SIGMUND ROSENBLUM, a subject of the Emperor of Russia, residing at London, and CHARLES JOHN YARNOLD, a subject of the Queen of England, residing at Brixton, London, in the county of Surrey, England, have invented certain new and useful Improvements in Apparatus for the Manufacture of Hydrogen Peroxid, of which the following is a specification.

Hydrogen peroxide is at present manufactured by acting on the peroxide of an alkaline earth, preferably barium peroxide, by an acid. The cost of this process is very considerable and has militated against a wide industrial application of the product, and as the latter when prepared by above process is very liable to contain numerous impurities it has been hitherto impossible to apply it for medical and many sanitary uses.

It is well known that ozone when acting in the presence of water upon certain organic chemical compounds will produce traces of hydrogen peroxide. Of such compounds the terpene series of the hydrocarbons have been found to yield to above reaction more easily than others. We have found, however, that besides these there is a whole series of organic compounds, especially the so-called "unsaturated" ones, among which may be classed many of the aldehydes and ketones, the camphors, the carbohydrates of the formula $(C_{10}H_{16})x$, (otherwise called "terpenes" and "polyterpenes,") nearly all the etherial or essential oils, which mainly consist of terpenes and polyterpenes, and also a large number of resins and balsams will when acted upon by ozone in the presence of water yield hydrogen peroxide in a smaller or lesser degree.

The chemical change which takes place in the above-stated order of reactions is not yet clearly known; but we presume that in the case of the above-enumerated unsaturated organic compounds an addition of ozone takes place, and peroxides of these compounds are formed. These peroxides when acted upon by water are decomposed into hydrogen peroxide and into the original unsaturated or only partially-oxidized compounds.

However, the yield of hydrogen peroxide in all the above-stated reactions, if carried out in the ordinary way, is an extremely small one and would be of no value for industrial or medical purposes; but we have found that by employing a method in conjunction with suitable apparatus hereinafter to be described the yield of hydrogen peroxide in any of the above-stated reactions can be enormously increased, and thus the utilization of these reactions for the production of hydrogen peroxide on a large scale be made possible and practicable.

Of all the above-stated organic compounds which will yield hydrogen peroxide when acted upon by ozone in the presence of water we have selected, on account of their comparatively low cost, the terpene and polyterpene series of the hydrocarbons as the most suitable ones for our purpose, and for the same reason we prefer to use oil or spirits of turpentine whenever a large yield of hydrogen peroxide at a low cost is desired.

Any of the above-enumerated organic compounds we may use for our purpose either single or in suitable mixtures of various proportions or dissolved in suitable solvents.

There are numerous methods by which we can manufacture hydrogen peroxide by the action of ozone and water or ozone and steam upon the above-mentioned organic compounds. For instance, hydrogen peroxide may be prepared by leading ozone and vaporized turpentine into water, or in the place of turpentine one or more of the above-mentioned organic compounds in a vaporized condition may be substituted, or as an alternative hydrogen peroxide may be formed by leading steam and ozone into turpentine or one or more of the organic compounds mentioned above, which, if necessary, can be in suitable solutions. The method, however, we prefer to adopt in the manufacture of hydrogen peroxide on a commercial scale consists in atomizing an emulsion or mixture of the original liquid or suitably-dissolved organic compound or compounds with water by means of ozone, or, if preferred, steam may be substituted for water, as will be more fully described hereinafter, and in carrying this principle into effect we prefer to employ the apparatus shown in the accompanying drawings, of which—

Figure 1 is a central vertical section. Fig. 2 is an enlarged view of a portion of Fig. 1, and Fig. 3 is a plan of Fig. 2.

A is a cylindrical casing carried by supports A'. Below it is a cylindrical vessel B, having a hermetic cover B'. Within the vessel is a duplex stirrer C, constituted by two sets C' C² of stirring arms or frames, the set C' being carried upon a tubular shaft C³ and the set C² carried upon a shaft C⁴, received concentrically within the shaft C³. Two sets of stirring-frames are rotated by means of bevel or other gearing in opposite directions. In the present example the shaft C³ carries at its upper end a bevel-wheel C⁵, and the shaft C⁴ is provided with a bevel-wheel C⁶. These two bevel-wheels are geared together by an intermediate wheel C⁷, which rotates the wheels C⁵ C⁶ and the shafts connected thereto in opposite directions, being itself driven by means of a shaft C⁸, supported in bearings C⁹ on the top of the cover B'. The lower ends of the shafts C³ C⁴ run in or upon the footstep-bearing C¹⁰.

B² is a pipe for the admission of the turpentine or other suitable organic liquid mixed or not with water into the vessel B, and B³ is a drain-cock placed at the bottom of the vessel to enable the latter to be drained when desired.

B⁴ is a pipe situated at the lower part of the vessel B, which may be curved to form a coil and is perforated to allow of the passage of the ozone in small jets through the liquid above it, as shown.

In the casing A and beneath the top cover A² is provided a hollow conical mounting A³, supporting a circular dish D, having a vertical annular flange D'. In the dish D is another dish D², somewhat shallower than the former.

D³ is a space below the dish D², communicating, on the one hand, with perforations D⁴, made through the latter near its circumference, and tubular spindles D⁵, hereinafter again referred to, and, on the other hand, with the upper portion of the interior of the vessel B by way of a pipe E, controlled by a valve E'.

A pipe F, in which is a valve F', extends upward from a point near the bottom of the interior of the vessel B through the cover B', the hollow conical mounting A³, and the bottom of the dish D² to afford communication between the vessel B and the space D⁶ in the dish D², which is closed by a cover D⁷, perforated with tapered conical holes D⁸, having their smaller ends uppermost. Tubular spindles D⁵ are screwed into the bottom of the dish D² and have coned upper ends, which extend into the holes D⁸. There is a passage-way through the holes D⁸ around the tapered upper ends of the tubular spindles D⁵, which latter constitutes passages for the ozone, as hereinafter described, from the space D³ to points just below the level of the top of the cover D⁷. They can be screwed up or down to regulate the area of the annular passage around them.

G is a pipe controlled by a valve G', affording communication between the chamber A and the interior of the vessel B.

H is a drain-pipe for draining the chamber A.

The operation is as follows: The turpentine or other suitable organic compound or mixture or suitable solution of such compounds is delivered into the vessel B through the pipe B² in conjunction with a suitable proportion of water to form an emulsion, or the water may be introduced into the vessel separately. An emulsion is formed by rotating the stirring frames or arms C' C² in opposite directions, and ozone, which should preferably be free from carbonic-acid gas, is then delivered into the vessel B through the perforated pipe B⁴ under any suitable pressure—say seven pounds to the square inch. The ozone passes in an upward direction through the emulsion, thereby ozonizing it, and collects at the top of the vessel B, thereby producing surface pressure, which forces the emulsion of turpentine and water up the pipe F into the space D⁶, while some of the ozone controlled by a cock E' passes up the pipe E into the space D³. A portion of the ozone escapes from the space D³ through the perforations D⁴ into the interior of the chamber A, while the remainder passes through the spindles D⁵ and draws the emulsion of turpentine and water from the space D⁶ through the tapering annular spaces of the passages D⁸. The emulsion meeting the ozone at the nozzles of the spindles D⁵ is atomized and in the form of a very fine spray is delivered, with the gas, into the interior of the chamber A, where it is met by the additional ozone which enters the vessel through the perforations D⁴. The turpentine, water, and ozone thus become intimately mixed, with the result that hydrogen peroxide is formed and simultaneously absorbed by the water. The mixture of turpentine and water containing hydrogen peroxide in solution falls to the bottom of the chamber A, whence it can either be withdrawn through the pipe H or conveyed through the pipe G back again to the vessel B for retreatment. The excess of ozone escapes from the chamber A by way of the exit-valve A⁴, and as it always carries with it uncondensed vapors of turpentine it is passed through suitable condensers in order to recover the turpentine.

It may sometimes be desirable to manufacture hydrogen peroxide *in situ* for its direct application to articles which are required to be oxidized or bleached. Again, we have found under some conditions the substitution of steam for water gives in certain cases more satisfactory results. For the manufacture of hydrogen peroxide under these conditions we prefer to employ the apparatus shown in Figs.

4 and 5, which, respectively, are modified forms of that shown in Figs. 2 and 3, and in which like letters represent like parts.

Figure 5:
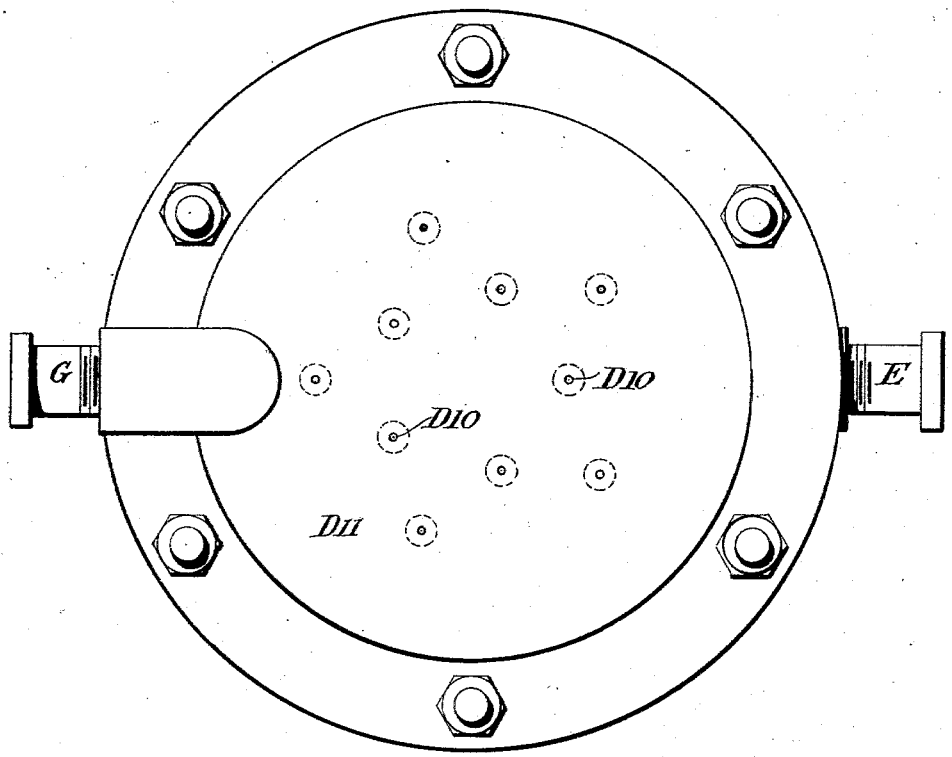
Figure 4:
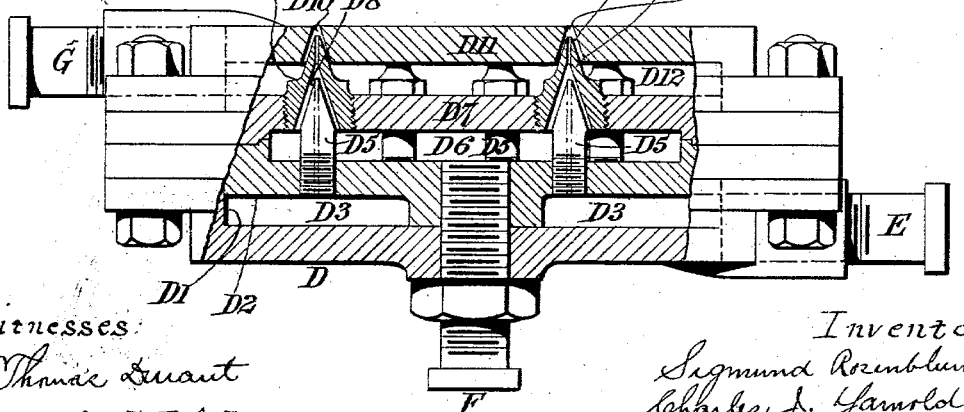

From Figs. 4 and 5 it will be seen that the spindles $D^5$ instead of opening into tapered holes in the plate $D^7$ open into tapered passages made in nozzles $D^9$, which are screwed into that plate and which in turn extend into tapered holes $D^{10}$ in a cover $D^{11}$. Between the plates $D^7$ and $D^{11}$ is a space $D^{12}$, into which, by way of a pipe G', steam is admitted for a purpose hereinafter explained, passing out in an upward direction around the nozzles $D^9$ through the holes $D^{10}$. The action is as follows: A turpentine or other suitable organic compound, either in a liquid or a vaporized form, is forced through the pipe F into the space $D^6$. Ozone, which should be free from moisture or carbonic-acid gas, enters by the pipe E into the space $D^3$. Steam enters the space $D^{12}$ through the pipe G'. The ozone passes from the space $D^3$ through the spindles $D^5$, nozzles $D^9$, and holes $D^{10}$, drawing up the turpentine from the space $D^5$ through the annular passage-way $D^8$, surrounding each nozzle $D^5$, and out through the nozzles $D^9$ and holes $D^{10}$ in company with the ozone. Steam from the space $D^{12}$ passes up the annular passages surrounding the nozzles $D^9$, the turpentine, ozone, and steam being delivered from the holes $D^{10}$ in an atomized or vaporized condition into the vessel A. (Shown in Fig. 1.) If it is desired to manufacture the hydrogen peroxide *in situ*, then the turpentine, ozone, and steam may be delivered from the openings $D^{10}$ directly onto the article to be bleached or otherwise treated.

The chamber B, if desired, may be jacketed with steam or hot water, and the several jets of fluid need not be delivered concentrically with one another, but may be otherwise arranged in any desired manner so long as they mingle intimately at some common point of issue.

It is clear from the above description of the process that the oil of turpentine or any other suitable organic compound used in our process is not actually and entirely consumed in it, but plays only an intermediary role in the reaction, so that if the whole process were carried out cautiously and quantitatively none or only a very small loss of the organic compound used would be experienced. In practice, however, we find that a small loss of the organic compound used occurs and also that in the case of several of the organic compounds here described a chemical change, known as "polymerization," takes place. We therefore prefer to dissolve or dilute the polymerized compounds in or with the particular compounds originally used before using it over again in our process, and we have found that a higher yield of hydrogen peroxide is the result of such procedure. Thus the compound which we employ in our process can, as is shown in the above, be used over again nearly indefinitely.

The whole process can, if desired, be made self-working or automatic and is carried out at the ordinary temperature. The concentration of the hydrogen peroxide produced depends upon the length of time the reaction is allowed to continue in our apparatus—*e. g.*, after the reaction has gone on for only five to six hours solutions of three "volumes" of hydrogen peroxide are produced. Such or stronger solutions can, if a very high concentration of hydrogen peroxide is desired, be enriched in their contents of hydrogen peroxide by evaporation *in vacuo*.

As the hydrogen peroxide is soluble in water, it is therefore found to be entirely present in the water used in this process.

When the process is considered to be finished—*i. e.*, when the desired concentration is attained—the aqueous solution of hydrogen peroxide is by any convenient means separated from the organic liquid employed, which as a rule is lighter and not miscible with the water. The aqueous solution of hydrogen peroxide so obtained usually still contains a trace of the organic compound employed or of any intermediary compounds which may have formed during the reaction, and as neither of these is soluble in water they will usually give to the aqueous solution of the hydrogen peroxide a turbid appearance. We have found, however, that if this turbid solution after having been separated is treated with ozone for quite a short time the traces of organic compounds contained therein will be decomposed or so altered in their composition that the solution is rendered perfectly clear.

The hydrogen peroxide produced by this process is more stable than when produced by any other process, and we have noticed that if it is exposed to the action of atmosphere it shows a tendency to absorb further quantities of oxygen.

As the hydrogen peroxide obtained by our process is free from any bodies which may be injurious to the human organism, it can therefore be used in suitable concentrations, solutions, or mixtures, or with suitable additions, for internal and external therapeutical purposes; also, as a general antiseptic, disinfectant, deodorant, and preservative against putrifaction, &c.; also, for the production of absolutely-pure oxygen for inhalations and for many other sanitary purposes.

It is well known that hydrogen peroxide on account of its being able to give off one atom of active or available oxygen in a nascent form is a very strong oxidizing and bleaching agent; but its present high cost has hitherto not allowed its wide application in these directions. As the hydrogen peroxide produced by our process is of a very low cost, it will become possible to apply it whenever a strong oxidizing or bleaching agent is required—as, for instance, for the bleaching of silks, yarns, feathers, ivory, bones, sugar syrups, oils, wood, cotton, and wool, for the removal of stains, removal of the last traces of "hypo" in photography, of chlorine and sulfur dioxide in the old bleaching processes, and so on. For all these purposes the aqueous hydrogen peroxide produced by our process can be used directly according to methods which may be found most convenient and practicable for the particular purpose; but we have also devised a new process, by means of which hydrogen peroxide, when required for several of the above-stated purposes, can be generated directly on the objects to be oxidized or bleached, and therefore its action as being *in situ* be made much more effective and considerably less costly. This new process is carried out as follows: The object to be oxidized or bleached—for example, cotton—is dipped into an emulsion of any of the already-mentioned organic compounds, preferably turpentine with water, and is then exposed to the action of ozone in a suitable receptacle, vessel, or chamber. The hydrogen peroxide resulting from the reaction is thus produced directly on the fiber, and we have found that even articles which are very difficult to bleach by the best ordinary processes will be entirely bleached in a very short time by means of this process, or the same process can also be carried out as follows: The articles to be bleached are dipped into the liquid organic compound—say turpentine—and then placed in a chamber into which ozone and low-pressure steam are allowed to enter. Hydrogen peroxide is formed on the fiber, and the article is bleached quickly and efficiently.

The apparatus or chambers in which any of the above-stated bleaching or oxidizing processes are carried out are supplied with outlet-pipes leading into similar condensing apparatus, as previously described, the object of which is to condense the fumes of the organic compound or compounds used and thus obviate their loss.

Articles bleached by way of the above-described modifications of our process retain a faint odor of the organic compound which has been used for the production of hydrogen peroxide; but this odor is easily removed from the article by a short exposure to hot steam and ozone. In order not to waste hydrogen peroxide, we have found that all articles to be bleached should before bleaching be freed from fatty matters, dirt, &c., by any of the ordinary methods adapted for this purpose. We have found that the usually deleterious action upon the fiber experienced in most bleaching processes does not take place in our process.

The above-described production of hydrogen peroxide *in situ* can be modified in numerous ways, according to the purpose for which it is required.

We claim—

In an apparatus for producing hydrogen peroxide, the combination with the vessel containing the turpentine and ozone under pressure, a dish or receptacle D having a vertical annular flange, a second dish $D^2$ carried by the first dish, leaving a space between said dishes, a cover for the dish $D^2$, a pipe leading from the space between the dish $D^2$ and cover to the lower portion of the interior of the receptacle B, a pipe leading from the space between the dishes D and $D^2$ to the top portion of the interior of the receptacle B, tubular spindles $D^5$ secured in the bottom of the dish $D^2$, the nozzles carried by the plate $D^7$ having tapered passages therein, into which the tubular spindles $D^5$ open, a cover $D^{11}$ having tapered holes therein into which the nozzles extend, and a steam-pipe communicating with the space $D^{12}$ between the cover $D^{11}$ and plate $D^7$; substantially as described.

In testimony whereof we have hereto set our hands in the presence of the subscribing witnesses.

SIGMUND ROSENBLUM.
CHARLES JOHN YARNOLD.

Witnesses to the signature of Sigmund Rosenblum:
 WILMER M. HARRIS,
 C. ROSE.

Witnesses to the signature of Charles John Yarnold:
 MARIA YARNOLD,
 G. F. WARREN.